April 27, 1926.
W. H. TROWBRIDGE
TRIMMING DEVICE
Filed Oct. 4, 1921
1,582,359
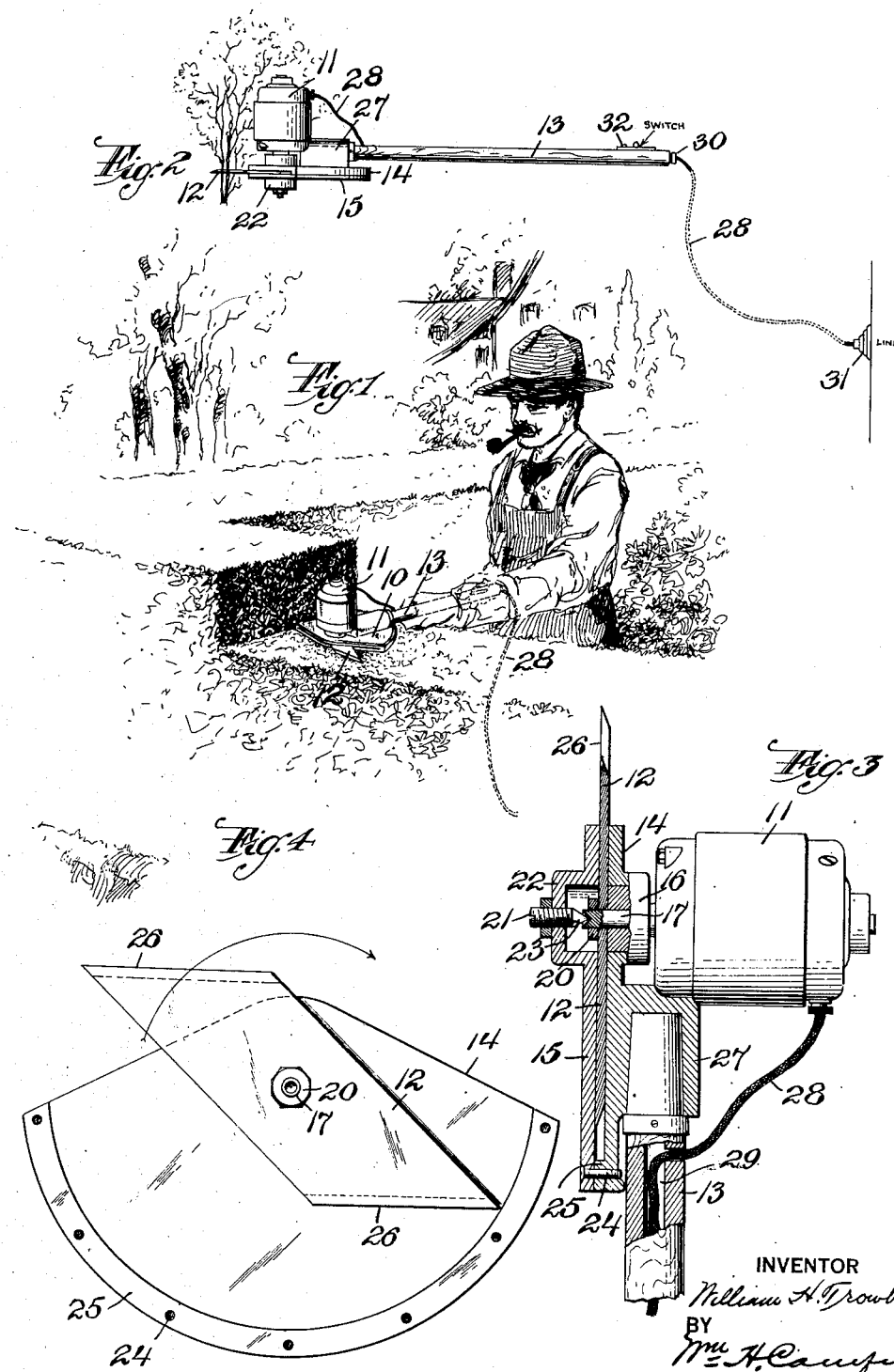

Patented Apr. 27, 1926.

1,582,359

UNITED STATES PATENT OFFICE.

WILLIAM H. TROWBRIDGE, OF PASSAIC, NEW JERSEY.

TRIMMING DEVICE.

Application filed October 4, 1921. Serial No. 505,229.

*To all whom it may concern:*

Be it known that I, WILLIAM H. TROWBRIDGE, a citizen of the United States, and a resident of Passaic, county of Passaic, and State of New Jersey, have invented certain new and useful Improvements in Trimming Devices, of which the following is a specification.

This invention relates to a trimming device which is particularly adapted for trimming and clipping foliage, and can be used for trimming bushes, trees and the like, but is more particularly adapted for trimming hedges, where an even and symmetrical appearance is very often desirable.

The invention relates to a device of this kind in which a substantially flat casing acts as a support for a motor and also for the knife, the device also being adapted to be used by means of a handle, and its general shape permitting of an observation by the operator of the trimming that he is doing with the machine.

The casing has an open side from which the knife, which rotates, projects for a portion of its rotation, and while thus free from the casing it cuts the foliage with a slicing action without the necessity of a shearing action, that is, without two opposed cutters coming together, this being due to the high speed imparted by the motor, which is preferably directly connected to the knife and which is operated by current supplied through a conductor, which, for convenience, is preferably arranged along the handle so as not to interfere with the operation of the device and which will not become entangled in the shrubbery and the like.

The invention is illustrated in the accompanying drawing, in which Figure 1 is a perspective view of the device and shows the method of operation on a hedge. Figure 2 is a side view of the device. Figure 3 is an enlarged side view of the lower part of the casing shown in section, and Figure 4 is a bottom view with the bottom plate removed.

The device in general consists of a casing 10 on which is mounted a motor 11 which rotates a knife 12, the knife 12 being adapted to be projected from the casing during a part of its rotation, and on the back of the casing is a handle 13, the preferred form of these parts being recited more in detail hereinafter. The knife is preferably of rhomboid form, as shown, so that when the ends are sharpened the cutting edges are tangential to the open end of the casing and to the shaft on which it is mounted.

The casing is, for the most part, substantially flat and is preferably made of two plates, the top plate 14 and the bottom plate 15, the top plate 14 having a bearing 16 through which the shaft 17 of the motor 11 passes and projects from the under side thereof, the shaft being provided with the knife 12. The knife is held on the shaft by suitable means, such as the nut 20 which can be screwed on the end of the shaft, which end of the shaft is also adapted to receive the stud 21 which is screwed through the bearing 22 on the lower plate, the stud being preferably pointed or tapered, as at 23, to enter a recess in the end of the shaft 17.

The plates 14 and 15 are held together by suitable means, such as screws 24. The top and bottom plates 14 and 15 are of arcuate form, one of them, as, for instance, the top plate 14, having a flange 25 which gives sufficient clearance between the two plates for the free operation of the knife, this arcuate form of the top and bottom plates of the casing thus providing an open end so that the knife, in its rotation, projects from the open end and, sweeping through that path of its travel while it is exposed, performs its cutting operation, since the knife operates at such high speed as to make shearing by two opposed cutters unnecessary.

The knife is preferably mounted so that it is supported at its center on the shaft 17, thus having two cutting ends which have the cutting edges 26, these cutting edges being arranged at an angle so that they are tangential to the center of rotation of the knife, each cutting edge thus slicing the shrubbery that is engaged by it, insuring clean cuts and leaving no rough or uneven edges to the cut parts.

The handle 13 is secured preferably to the top of the device, the form of fastening the handle that is illustrated comprising a lug 27 on the top plate 14 in rear of the motor 11, if desired this lug acting as an abutment against which the motor can rest to stabilize it and prevent undue vibration thereof. The conductor 28 which is used for supplying current to the motor is preferably passed along the handle, usually through the channel 29 arranged lengthwise in the handle, or along the outside, exposed, or through a groove the conductor emerging from the end of the handle to a suitable clip 30 and leading to any suitable source of supply, such as an outlet box or wall plate 31. A suitable switch 32 is arranged on or in the handle for regulating the operation of the device in so far as supplying electric current to the motor is concerned.

It will be evident that with this form of device, when operated as illustrated in Figure 1, there is a unitary structure easily portable, and the substantially flat casing permits an observation, by the operator of the device, of the cutting so that the limitations of cutting or the evenness of the surface being cut can be observed, the flat casing assisting in holding the device in its flat position and forming somewhat of a gage by means of which the device can be guided.

The bottom plate 15 can be dispensed with in particular cases and sufficient protection be given to the operator by extending the flange 25 down a material distance beyond the knife, this also permitting the employment of fan-shaped knives and similar cutting devices.

I claim:

1. A trimming device comprising a substantially flat casing made of two plates of arcuate form, the casing having an open end, a shaft passing into the casing, a knife secured at its centre on the shaft and fitting between the plates so as to clear the space between them when inside the casing and to perform its cutting operation when it swings free of the casing, the blade being of rhomboid form with its ends sharpened to form cutting edges parallel to lines tangential to the shaft and to the open end of the casing, a motor on the casing, and a handle projecting from the casing opposite its open end.

2. A trimming device comprising a casing formed of two plates spaced apart, said plates being of arcuate form, a motor mounted on one plate and having a shaft projecting through the plate, an adjustable bearing on the second plate to engage the end of the shaft, a flat knife on the shaft fitting between the plates and adapted to be projected when rotating so as to perform its cutting operation free of the casing, a boss on one of said plates, a handle projecting from the boss, and a conductor passing along the handle and supported thereby and connected to the motor.

3. A trimming device comprising a casing formed of two plates spaced apart, said plates being of arcuate form, a motor mounted on one plate and having a shaft projecting through the plate, a stud secured in the second plate and adapted to engage the end of the shaft, a flat knife with a cutting edge that is parallel to lines tangential to the shaft, said knife being secured on the shaft, the shaft being disposed so that the knife swings free of the casing to perform its cutting operation, a handle secured to one of the plates in rear of the motor, and a conductor connected to the motor and supported along said handle.

In testimony that I claim the foregoing, I have hereto set my hand, this 27th day of July, 1921.

WM. H. TROWBRIDGE.